(12) United States Patent
John

(10) Patent No.: US 8,120,191 B1
(45) Date of Patent: Feb. 21, 2012

(54) EFFICIENT ENERGY CONVERSION DEVICES AND METHODS

(76) Inventor: Hanback John, Flint Hills, VA (US)

( * ) Notice: Subject to any disclaimer, the term of this patent is extended or adjusted under 35 U.S.C. 154(b) by 0 days.

(21) Appl. No.: 13/091,124

(22) Filed: Apr. 21, 2011

(51) Int. Cl.
*F03D 9/00* (2006.01)
(52) U.S. Cl. .......................................... 290/43; 290/44
(58) Field of Classification Search .................. 290/42, 290/43, 44, 53, 54, 55
See application file for complete search history.

(56) References Cited

U.S. PATENT DOCUMENTS

| | | | |
|---|---|---|---|
| 4,274,010 A | 6/1981 | Lawson-Tancred | |
| 5,659,205 A * | 8/1997 | Weisser | 290/52 |
| 5,708,305 A * | 1/1998 | Wolfe | 290/53 |
| 5,836,738 A * | 11/1998 | Finney | 415/60 |
| 6,246,126 B1 * | 6/2001 | Van Der Veken et al. | 290/55 |
| 6,276,449 B1 | 8/2001 | Newman | |
| 6,978,607 B2 | 12/2005 | Matsumoto et al. | |
| 7,808,120 B2 * | 10/2010 | Smith | 290/42 |
| 7,893,553 B1 * | 2/2011 | Calhoon | 290/44 |
| 2010/0209245 A1 | 8/2010 | Migliori | |

FOREIGN PATENT DOCUMENTS

| WO | WO 2010/124012 | 10/2010 |
|---|---|---|
| WO | WO 2011/011682 | 1/2011 |

* cited by examiner

*Primary Examiner* — Nicholas Ponomarenko
(74) *Attorney, Agent, or Firm* — B. Y. Mathis

(57) ABSTRACT

In various embodiments, an apparatus for producing electricity includes a plurality of hydraulic-to-electric converters with each hydraulic-to-electric converters including a hydraulic motor coupled to a common high-pressure hydraulic line and a common low-pressure hydraulic line, a controllable hydraulic switch hydraulically coupled to each respective hydraulic motor, each controllable hydraulic switch being capable of controllably placing the respective hydraulic motor on-line by allowing flow of hydraulic fluid from the common high-pressure hydraulic line through its respective hydraulic motor or off-line by preventing flow of hydraulic fluid from the common high-pressure hydraulic line through its respective hydraulic motor, and an electric generator mechanically coupled to each respective hydraulic motor and configured to generate electricity when hydraulic fluid flows through the respective hydraulic motor. The apparatus further includes a control system coupled to each controllable hydraulic switch configured to place individual hydraulic motors on-line or off-line as a function of available energy provided by the high-pressure line.

20 Claims, 4 Drawing Sheets

EFFICIENT ENERGY CONVERSION DEVICES AND METHODS

This application claims priority to U.S. patent application Ser. No. 13/027,409 to John HANBACK filed on Feb. 15, 2011 entitled "Efficient Energy Conversion Devices and Methods," the content of which is incorporated herein in its entirety.

BACKGROUND

1. Field

This disclosure relates to methods and system for extracting energy from hot atmospheric air and/or wind.

2. Background

The idea of creating electrical energy from environmental forces, such as wind, ocean currents and tides, and hot/dry air is not new. Unfortunately, such environmental forces tend to be unreliable in intensity or cyclical in their nature. For example, windmills are often subjected to wind speeds varying by orders of magnitude in a given day. While the fundamental notions of converting mechanical energy from the environment are sound, efficiently capturing such mechanical energy and converting it to electrical energy poses many practical problems that often have not been addressed.

BRIEF DESCRIPTION OF THE DRAWINGS

The features and nature of the present disclosure will become more apparent from the detailed description set forth below when taken in conjunction with the accompanying drawings in which reference characters identify corresponding items.

DETAILED DESCRIPTION

The disclosed methods and systems below may be described generally, as well as in terms of specific examples and/or specific embodiments. For instances where references are made to detailed examples and/or embodiments, it should be appreciated that any of the underlying principals described are not to be limited to a single embodiment, but may be expanded for use with any of the other methods and systems described herein as will be understood by one of ordinary skill in the art unless otherwise stated specifically.

Figure 1:
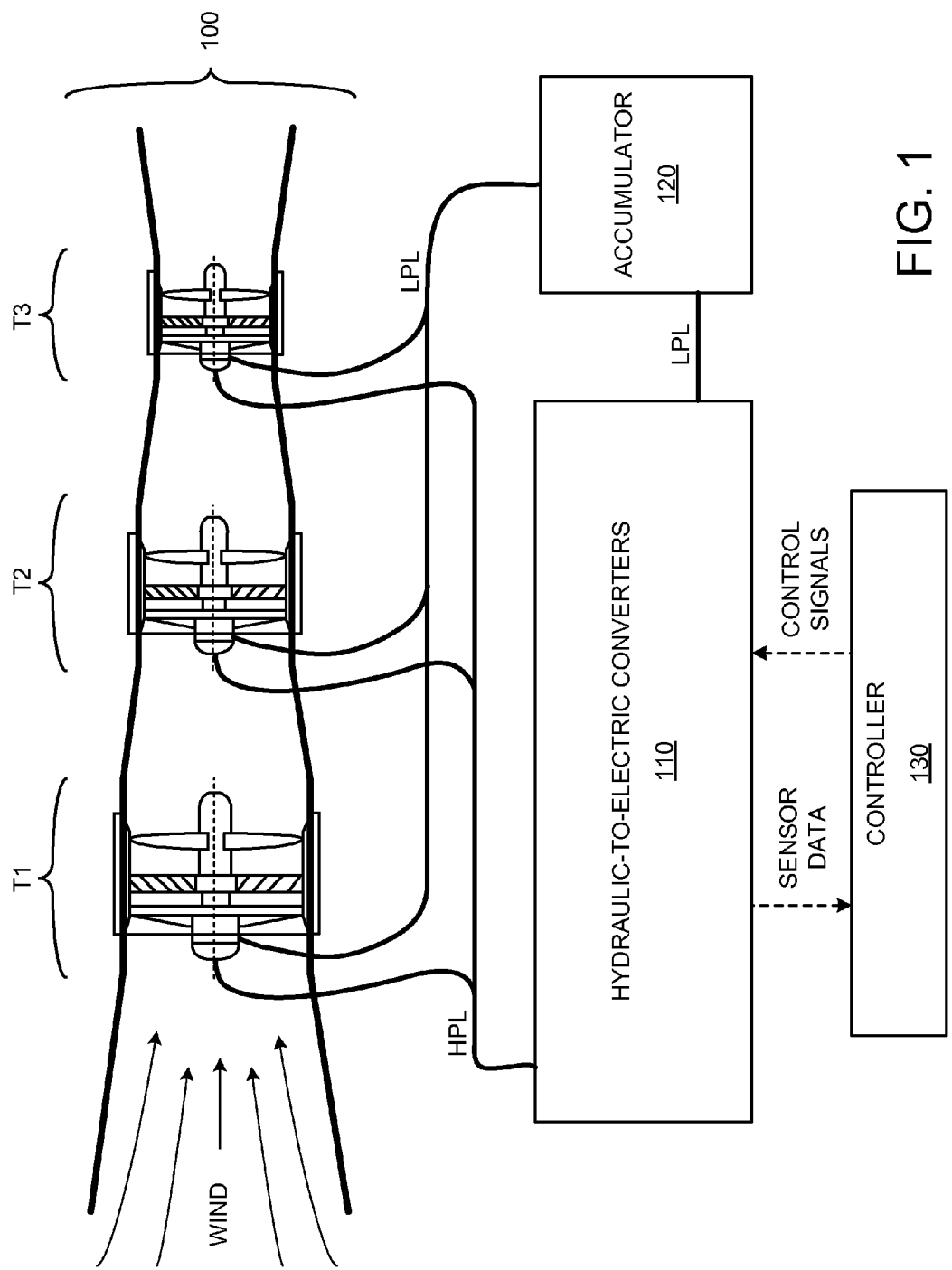
FIG. 1 depicts a wind-tunnel coupled to a novel hydraulic system capable of maintaining high efficiency hydraulic-to-electric conversion under a wide variance of wind speeds.

FIG. 1 depicts a wind-tunnel 100 coupled to a novel hydraulic system capable of maintaining high efficiency hydraulic-to-electric conversion under a wide variance of wind speeds. As shown in FIG. 1, the wind tunnel 100 includes a plurality of wind turbines T1, T2 and T3. Coupled to the turbines T1-T3 (via a low-pressure line (LPL) and a high-pressure line (HPL)) is an array of hydraulic-to-electric converters 110 and a hydraulic accumulator 120. A controller 130 is coupled to the hydraulic-to-electric converters 110.

The controller 130 of FIG. 1 is a triple-redundant dedicated processing system containing a three separate central processing units (CPUs) with respective memories and dedicated peripherals all coupled together such that a single failure will not affect control. However, it should be appreciated to those skilled in the art that the controller 130 may take alternative embodiments, such a single CPU-based system, an FPGA or other form of dedicated logic, an analog-based control system including op-amps and comparators, or any other known or later-developed system capable of controlling hydraulic and/or electric systems.

In operation, wind (captured from the environment) flows from left-to-right through turbines T1-T3 with each turbine T1-T3 extracting some measure of energy from the air with energy availability being proportional to the cube of wind speed at each turbine T1-T3. Assuming that approximately 50% of energy may be extracted by each turbine T1-T3, it may be advantageous to make the swept area of the blades of turbine T2 half that of turbine T1, and to make the swept area of the blades of turbine T3 half that of turbine T2. Should energy extraction vary from 50%, the ratios of the wind-swept area of the blades of the various turbines may change accordingly.

In differing embodiments, greater or fewer turbines may be used.

In the example of FIG. 1, each of the various turbines T1-T3 include a fixed-displacement hydraulic pump capable of pumping fluid from the LPL to the HPL. While the turbines T1-T3 are depicted as being coupled to the same LPL and HPL, in various alternative embodiments the individual turbines T1-T3 may be coupled to independent hydraulic systems via separate LPL and HPL lines and with separate arrays of hydraulic-to-electric converters. In some of these alternative embodiments, the turbines T1-T3 may be cross-coupled at the HPL and LPL lines to use a subset of the available arrays of hydraulic-to-electric converters via hydraulic switches. Accordingly, the turbines T1-T3 may be coupled to the same array of hydraulic-to-electric converters or to different arrays of hydraulic-to-electric converters, which may be useful to compensate for large changes in wind speed within tunnel 100.

As the HPL provides high-pressure hydraulic fluid to the array of hydraulic-to-electric converters 110, individual hydraulic-to-electric converters within the array of hydraulic-to-electric converters 110 controllably receive the hydraulic fluid and convert hydraulic energy (=hydraulic pressure×fluid flow) into electrical energy (=voltage×current).

Figure 2:
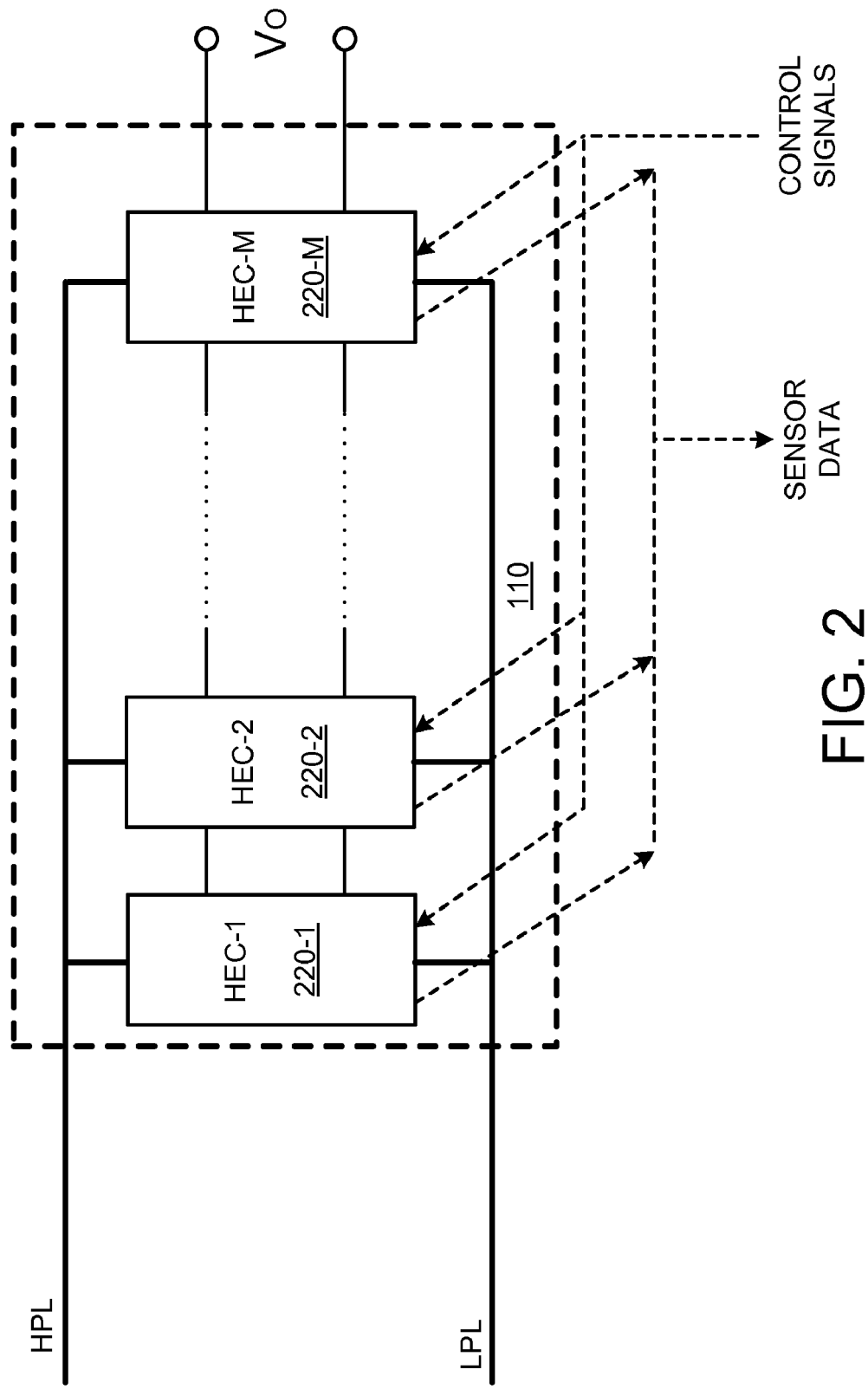
FIG. 2 depicts the array of hydraulic-to-electric converters of FIG. 1.

FIG. 2 depicts details of the array of hydraulic-to-electric converters 110 of FIG. 1. As shown in FIG. 2, the array of hydraulic-to-electric converters 110 includes a plurality of hydraulic-to-electric converters (HECs) 220-1 . . . 220-M arranged in parallel with a common set of input hydraulic lines HPL and LPL, and a set of electrical outputs (Vo) that may be commonly coupled to one another. As is also shown in FIG. 2, sensor data may be extracted from each HEC 220-1 . . . 220-M, and one or more control signals may be fed to each HEC 220-1 . . . 220-M for the purposes of placing individual HECs on-line or off-line. Accordingly, as power/energy becomes less available on the HPL due to slowed wind conditions, sensor data may be used by the controller 130 (of FIG. 1) to determine/select which of the HECs 220-1 . . . 220-M to take off-line, where after the appropriate commands may be sent by a controller, such as the controller 130 of FIG. 1, to the selected HECs to effectively remove the selected HECs from use. Accordingly, those HECs remaining on-line can have a regulated hydraulic flow within a specified range of flow and/or a constant pressure across the HECs HEC 220-1 . . . 220-M can be maintained within a specified range. This in turn will keep electric generators coupled to the HECs turning at a specified rate and/or with a specified torque.

As hydraulic motors and electric generators are often designed for specific ranges of torque and RPMs, it may be appreciated that slowed wind speed may cause operating conditions to fall below those optimum operating design conditions. Accordingly, the present system corrects for this shortcoming as the controller 130 may automatically take individual HECs on-line and off-line as needed based on wind-tunnel conditions that may be reflected by any number of sensors, such as wind-speed sensors located in the wind tunnel 100, RPM sensors coupled to each turbine T1-T3, and so on.

By operating the HECs 220-1 . . . 220-M in this manner, the controller 130 can reserve more power for each of the HECs that remain on-line so as to allow such remaining HECs to operate under generally optimal or otherwise favorable conditions. Such favorable conditions may include, for example: an optimal or favorable range of pressure differential across hydraulic motors that remain on-line; an optimal or favorable range of fluid flow through those hydraulic motors that remain on-line; an optimal or favorable rate of rotation for either or both of hydraulic motors and electric generators that remain on-line; any set of conditions that provide generally optimum hydraulic-to-mechanical conversion efficiency for a hydraulic motor; and any set of conditions that provide generally optimum mechanical-to-electrical conversion efficiency for an electric generator. By way of example, assuming that available hydraulic power/energy drops 80%, a controller may proportionately remove 80% of the HECs 220-1 . . . 220-M from use so that hydraulic flow through individual HECs that remain on-line and/or the pressure differential between the HPL and LPL remains somewhere in a desired range with each remaining HEC operating within a desired range(s) to allow hydraulic motors and electric generators to operate at specific conditions—typically at 1800 RPM and at a specific torque. An end effect is that the HECs 220-1 . . . 220-M can produce a stream of constant electric power at substantially different power levels. For example, the HECs 220-1 . . . 220-M may be coupled to a common power grid to supply the grid with power levels of Pout=N×K watts in a stepwise-continuous fashion, where N is a positive integer representing the number of on-line hydraulic motors, and K represents the power output of each electric generator coupled to each on-line hydraulic motor. (e.g. Pout may be 0 watts, 5K watts, 10K watts, 15K watts, etc).

Figure 3:
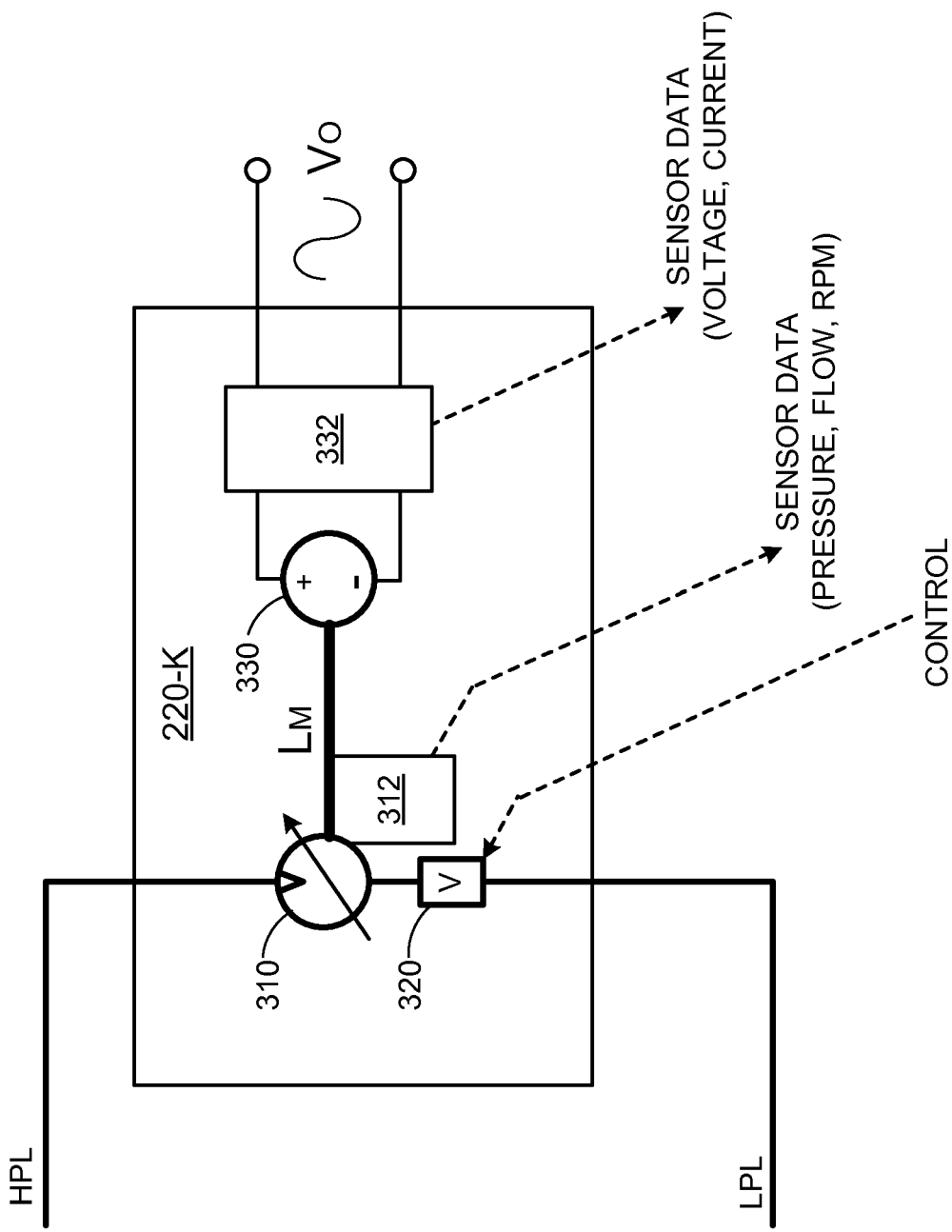
FIG. 3 depicts details of a single hydraulic-to-electric converter of FIG. 2.

FIG. 3 depicts an exemplary HEC 200-K of FIG. 2. As shown in FIG. 2, the HEC 200-K includes a variable displacement hydraulic motor 310, a hydraulic on/off valve/switch 320 and an electric generator 330 coupled to the hydraulic motor 310 via mechanical linkage $L_M$. The hydraulic motor 310 is directly coupled to an HPL line and indirectly coupled to an LPL line, and it is assumed that any pressure differential across the hydraulic on/off valve/switch 320 can be discounted. Hydraulic sensors 312 provide various sensed data, such as pressure across the hydraulic motor 310, fluid flow through the hydraulic motor 310, the rotational rate of the hydraulic motor 310 and the torque provided by the hydraulic motor. Electric sensors 332 similarly provide sensor data, such as voltage, current and possible frequency information if the electric generator 330 provides AC power.

While the present example makes use of a variable displacement hydraulic motor, in some embodiments, a fixed displacement hydraulic motor may be used. A variable displacement hydraulic motor adds a finer amount of control over speed or torque. A fixed displacement motor, in contrast, is much smaller and less expensive and may be a better design choice when fine granularity of control is not needed.

In operation, under control of a controller, a flow of hydraulic fluid is controllably provided through the hydraulic motor 310 via the hydraulic valve/switch 320. In response to the hydraulic fluid flow and the hydraulic pressure across the hydraulic motor 310, the hydraulic motor 310 rotates so as to provide energy/power to the electric generator 330 (via linkage $L_M$) to enable the electric generator 330 to produce electrical energy at a DC level or perhaps AC energy at a particular frequency (e.g., 60 Hz) at a power level optimal to the design of the generator 330. Note that, instead of using the hydraulic valve/switch 320 to control the on-off state of HEC 220-K, the HEC 220-K may be effectively turned off or otherwise altered by uncoupling the voltage output Vo from an electric power grid or by disengaging linkage $L_M$. In various embodiments, the voltage output Vo may be commonly coupled to the voltage output of one or more other HECs.

Figure 4:
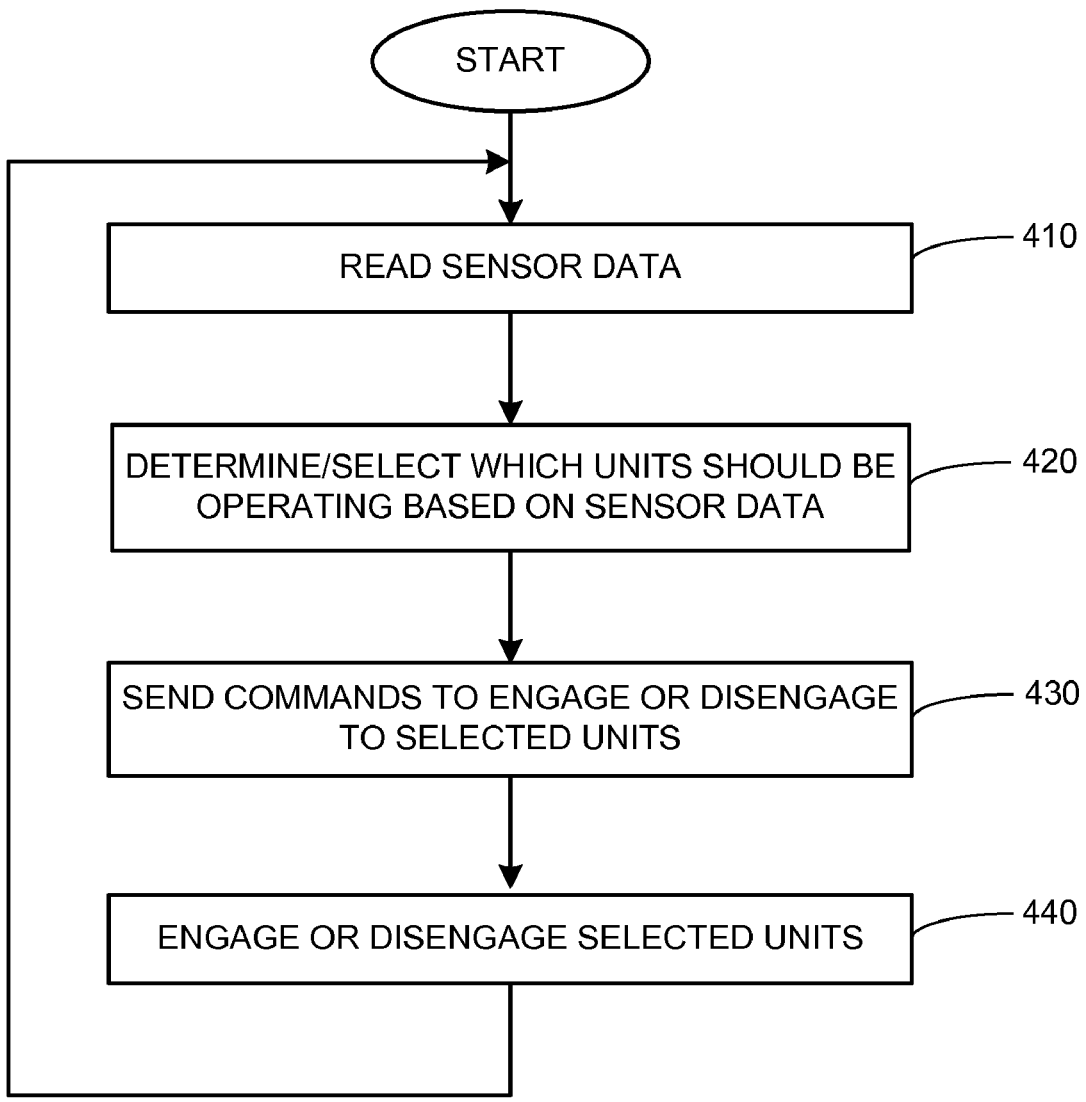
FIG. 4 is a flowchart outlining an exemplary operation for efficiently converting mechanically captured energy into electricity.

FIG. 4 is a flowchart outlining an exemplary operation for efficiently converting mechanically captured energy into electricity using plurality of HECs with each HEC including a hydraulic motor coupled to a common high-pressure hydraulic line and a common low-pressure line, a controllable hydraulic switch hydraulically coupled to each respective hydraulic motor, each controllable hydraulic switch being capable of controllably placing the respective hydraulic motor on-line by allowing flow of hydraulic fluid from the common high-pressure hydraulic line through its respective hydraulic motor or off-line by preventing flow of hydraulic fluid from the common high-pressure hydraulic line through its respective hydraulic motor, and an electric generator mechanically coupled to each respective hydraulic motor and configured to generate electricity when hydraulic fluid flows through the respective hydraulic motor.

The process starts in step 410 where sensor data may be accumulated from various sources. As discussed above, such sensor data may include wind speed, wind turbine rotational speed, hydraulic pressure data, hydraulic fluid flow data, hydraulic motor torque, hydraulic motor rotational speed, electric output voltage data, electric output current data, DC output voltage data, AC output voltage and/or frequency data, and so on. Next, in step 420, the sensor data of step 410 may be used to determine/select which HECs in an array of HECs should be operating, i.e., placed on-line or off-line. As discussed above HECs may be placed on-line or off-line as a function of the available energy available via the hydraulic lines attached to the HECs; an optimal or favorable range of pressure differential across hydraulic motors for those HECs that remain on-line; an optimal or favorable range of fluid flow through those hydraulic motors for those HECs that remain on-line; an optimal or favorable rate of rotation for either or both of hydraulic motors and electric generators for those HECs that remain on-line; any set of conditions that provide generally optimum hydraulic-to-mechanical conversion efficiency for a hydraulic motor; and any set of conditions that provide generally optimum mechanical-to-electrical conversion efficiency for an electric generator, and so on. Control continues to step 430.

In step 430, commands are sent to the selected HECs to place them on-line (engage) or off-line (disengage). Next, in step 440, in response to the commands of step 430, the selected HECs are appropriately placed on-line or off-line. Control then jumps back to step 410 where the process is repeated as required or otherwise desired.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

It will be understood that many additional changes in the details, materials, steps and arrangement of parts, which have been herein described and illustrated to explain the nature of the invention, may be made by those skilled in the art within the principal and scope of the invention as expressed in the appended claims.

What is claimed is:

1. An apparatus for producing electricity, comprising:
   a plurality of hydraulic-to-electric converters with each hydraulic-to-electric converters including:
      a hydraulic motor coupled to a common high-pressure hydraulic line and a common low-pressure hydraulic line;
      a controllable hydraulic switch hydraulically coupled to each respective hydraulic motor, each controllable hydraulic switch being capable of controllably placing its respective hydraulic motor on-line by allowing flow of hydraulic fluid from the common high-pressure hydraulic line through its respective hydraulic motor or off-line by preventing flow of hydraulic fluid from the common high-pressure hydraulic line through its respective hydraulic motor; and
      an electric generator mechanically coupled to each respective hydraulic motor and configured to generate electricity when hydraulic fluid flows through the respective hydraulic motor, wherein power outputs for each electric generator are commonly coupled; and
   a control system coupled to each controllable hydraulic switch configured to place individual hydraulic motors on-line or off-line as a function of available energy provided by the high-pressure line so as to enable the electric generators to produce continuous electric power at substantially different power levels.

2. The apparatus of claim 1, wherein the control system is configured to place individual hydraulic motors on-line or off-line in order to maintain a first range of pressure differential across those hydraulic motors that remain on-line.

3. The apparatus of claim 2, wherein the control system is configured to place individual hydraulic motors on-line or off-line in order to maintain a first range of fluid flow through those hydraulic motors that remain on-line.

4. The apparatus of claim 1, wherein the control system is configured to place individual hydraulic motors on-line or off-line in order to maintain a first range of fluid flow through those hydraulic motors that remain on-line.

5. The apparatus of claim 1, wherein the control system is configured to place individual hydraulic motors on-line or off-line in order to enable those hydraulic motors that remain on-line to operate under conditions that provide generally optimum hydraulic-to-mechanical conversion efficiency.

6. The apparatus of claim 1, wherein each hydraulic motor is a variable displacement hydraulic motor.

7. The apparatus of claim 1, wherein each hydraulic-to-electric converter further includes a flow sensor capable of measuring flow of hydraulic fluid through its respective hydraulic motor.

8. The apparatus of claim 7, further comprising at least one pressure sensor capable of measuring hydraulic fluid pressure across the hydraulic motors.

9. The apparatus of claim 7, wherein each hydraulic-to-electric converter further includes a rate sensor capable of measuring the rotational rate of its respective hydraulic motor.

10. The apparatus of claim 8, wherein each hydraulic-to-electric converter further includes at least one of a voltage sensor capable of measuring an output voltage of its respective electric generator or a current sensor capable of measuring an output current of its respective electric generator.

11. The apparatus of claim 1, further comprising a plurality of wind turbines coupled to the common high-pressure hydraulic line capable of converting wind energy to hydraulic energy in the form of hydraulic pressure and fluid flow.

12. The apparatus of claim 1, wherein the substantially different power levels include at least two stepwise continuous power levels of N×K watts, where N is a positive integer representing the number of on-line hydraulic motors, and K represents the power output of each electric generator coupled to each on-line hydraulic motor.

13. A method for producing electricity from a plurality of hydraulic-to-electric converters with each hydraulic-to-electric converters including a hydraulic motor coupled to a common high-pressure hydraulic line and a common low-pressure hydraulic line, a controllable hydraulic switch hydraulically coupled to each respective hydraulic motor, each controllable hydraulic switch being capable of controllably placing its respective hydraulic motor on-line by allowing flow of hydraulic fluid from the common high-pressure hydraulic line through its respective hydraulic motor or off-line by preventing flow of hydraulic fluid from the common high-pressure hydraulic line through its respective hydraulic motor, and an electric generator mechanically coupled to each respective hydraulic motor and configured to generate electricity when hydraulic fluid flows through the respective hydraulic motor, wherein power outputs for each electric generator are commonly coupled, the method comprising:
   controlling each controllable hydraulic switch so as to place individual hydraulic motors on-line or off-line as a function of available energy provided by the high-pressure line so as to enable the electric generators to produce continuous electric power at substantially different power levels via commonly coupled power outputs for each electric generator.

14. The method of claim 13, wherein the step of controlling places individual hydraulic motors on-line or off-line in order to maintain a first range of pressure differential across those hydraulic motors that remain on-line.

15. The method of claim 13, wherein the step of controlling places individual hydraulic motors on-line or off-line in order to maintain a first range of fluid flow through those hydraulic motors that remain on-line.

16. The method of claim 13, wherein the step of controlling places individual hydraulic motors on-line or off-line in order to enable those hydraulic motors that remain on-line to operate under conditions that provide generally optimum hydraulic-to-mechanical conversion efficiency.

17. The method of claim 13, wherein the step of controlling places individual hydraulic motors on-line or off-line in order to enable the electric generators of those hydraulic motors that remain on-line to operate under conditions that provide generally optimum mechanical-to-electrical conversion efficiency.

18. The method of claim 13, further comprising:

sensing one or more hydraulic states to produce one or more sensed hydraulic states;

wherein the step of controlling each controllable hydraulic switch includes determining which hydraulic-to-electric converters are to be off-line or on-line based on the one or more sensed hydraulic states.

19. The method of claim 18, further comprising:

sensing one or more electrical states to produce one or more sensed electrical states;

wherein the step of controlling each controllable hydraulic switch includes determining which hydraulic-to-electric converters are to be off-line or on-line based on the one or more sensed electrical states.

20. The method of claim 13, wherein the substantially different power levels include at least two stepwise continuous power levels of N×K watts, where N is a positive integer representing the number of on-line hydraulic motors, and K represents the power output of each electric generator coupled to each on-line hydraulic motor.

* * * * *